United States Patent
Zeng et al.

(10) Patent No.: US 9,435,653 B2
(45) Date of Patent: Sep. 6, 2016

(54) SENSOR-AIDED VEHICLE POSITIONING SYSTEM

(71) Applicant: GM GLOBAL TECHNOLOGY OPERATIONS LLC, Detroit, MI (US)

(72) Inventors: Shuqing Zeng, Sterling Heights, MI (US); Jeremy A. Salinger, Southfield, MI (US); Bakhtiar B. Litkouhi, Washington, MI (US); Joel Pazhayampallil, Bellerose, MI (US); Kevin A. O'Dea, Ann Arbor, MI (US); James N. Nickolaou, Clarkston, MI (US); Mark E. Shields, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 97 days.

(21) Appl. No.: 14/028,709

(22) Filed: Sep. 17, 2013

(65) Prior Publication Data

US 2015/0081211 A1  Mar. 19, 2015

(51) Int. Cl.
| | |
|---|---|
| *G01C 21/30* | (2006.01) |
| *B60W 30/095* | (2012.01) |
| *B60W 30/12* | (2006.01) |
| *G01S 13/93* | (2006.01) |
| *G05D 1/02* | (2006.01) |
| *G01C 21/36* | (2006.01) |
| *G01S 13/06* | (2006.01) |
| *G01S 19/48* | (2010.01) |
| *G01S 5/16* | (2006.01) |

(52) U.S. Cl.
CPC .......... *G01C 21/30* (2013.01); *B60W 30/0956* (2013.01); *B60W 30/12* (2013.01); *G01C 21/3602* (2013.01); *G01S 13/931* (2013.01); *G05D 1/0212* (2013.01); *G01S 5/16* (2013.01); *G01S 13/06* (2013.01); *G01S 19/48* (2013.01); *G01S 2013/9357* (2013.01)

(58) Field of Classification Search
CPC  G01C 21/005; G01C 21/30; G01C 21/3602; B60W 30/0956; B60W 30/12; G01S 13/06; G01S 13/931; G01S 2013/9357; G01S 19/48; G01S 5/16; G05D 1/0212
USPC ........................................................ 701/446
See application file for complete search history.

(56) References Cited

U.S. PATENT DOCUMENTS

| | | | | |
|---|---|---|---|---|
| 6,041,280 | A  * | 3/2000 | Kohli ..................... | G01C 21/26 342/357.3 |
| 8,738,035 | B1 * | 5/2014 | Ramakrishnan ........ | G01S 19/48 342/451 |
| 2007/0018811 | A1* | 1/2007 | Gollu ....................... | 340/539.13 |
| 2008/0243378 | A1* | 10/2008 | Zavoli .................... | G01C 21/28 701/533 |
| 2010/0191461 | A1* | 7/2010 | Zeng ................... | B60W 40/076 701/532 |
| 2010/0246889 | A1* | 9/2010 | Nara .................. | G06K 9/00798 382/104 |
| 2013/0162824 | A1* | 6/2013 | Sung et al. ................... | 348/148 |

* cited by examiner

*Primary Examiner* — Aaron L Troost

(57) ABSTRACT

A method and system for localizing a vehicle in a digital map includes generating GPS coordinates of the vehicle on the traveled road and retrieving from a database a digital map of a region traveled by the vehicle based on the location of the GPS coordinates. The digital map includes a geographic mapping of a traveled road and registered roadside objects. The registered roadside objects are positionally identified in the digital map by longitudinal and lateral coordinates. Roadside objects in the region traveled are sensed by the vehicle. The sensed roadside objects are identified on the digital map. A vehicle position on the traveled road is determined utilizing coordinates of the sensed roadside objects identified in the digital map. The position of the vehicle is localized in the road as a function of the GPS coordinates and the determined vehicle position utilizing the coordinates of the sensed roadside objects.

12 Claims, 7 Drawing Sheets

SENSOR-AIDED VEHICLE POSITIONING SYSTEM

BACKGROUND OF INVENTION

An embodiment relates generally to vehicle positioning systems.

Global Positioning System (GPS) or other Global Navigation Satellite System (GNSS) receivers operate by tracking line of sight signals. These receivers typically require at least four or more satellites to be continuously available in an unobstructed line of sight of a satellite receiver on a vehicle. Due to natural and man-made obstructions (e.g., buildings) or natural obstructions (i.e., dense tree cover), the theoretical minimum number of satellites required to accurately determine a position of the satellite receiver may not be available under certain conditions. It is well known that GPS positional errors may be as great as 30 meters. While such errors may result in minor inconveniences in navigation as to whether the vehicle is exactly at a location (e.g., intersection), greater issues are present when systems such as lane centering or speed control is used when the vehicle is traveling through a curved portion of the road. If an automated vehicle system is controlling the speed or the centering of the vehicle and the system relies on the position on the GPS position of the vehicle, then estimating that the vehicle is on a linear portion of the road as opposed to a curved portion of the road may have negative implications.

SUMMARY OF INVENTION

An advantage of an embodiment is the detection of objects in a vicinity of a road of travel by vehicle object detection devices for comparison to a digital map to correct any positional errors in the determined GPS position. In addition, other signals from other devices such as Wi-Fi, RFID tags, and pseudolites may be used individually or in cooperation with one another for identifying a vehicle position with the roadway which is used to correct any GPS positional errors.

A method for localizing a vehicle in a digital map includes generating GPS coordinates of the vehicle on the traveled road. A digital map of a region traveled by the vehicle based on the location of the GPS coordinates is retrieved from a database. The digital map includes a geographic mapping of a traveled road and registered roadside objects. The registered roadside objects are positionally identified in the digital map by longitudinal and lateral coordinates. Roadside objects in the region traveled by the vehicle are sensed. The sensed roadside objects on the digital map are identified. A vehicle position on the traveled road is determined utilizing coordinates of the sensed roadside objects identified in the digital map. The position of the vehicle in the road of travel is localized as a function of the GPS coordinates and the determined vehicle position utilizing the coordinates of the sensed roadside objects.

A sensor-aided vehicle positioning system a GPS-based device generating GPS coordinates of a vehicle on a traveled road. A database includes digital map data used to generate a digital map of a region traveled by the vehicle based on the location of the GPS coordinates. The digital map includes a geographic mapping of a traveled road and registered roadside objects. The registered roadside objects are positionally identified in the digital map by longitudinal and lateral coordinates. An object detection device senses roadside objects in the region traveled by the vehicle. The sensed roadside objects are identified on the digital map. A processing unit determines a vehicle position on the traveled road utilizing coordinates of the sensed roadside objects identified in the digital map. The processing unit localizes the position of the vehicle in the road of travel as a function of the GPS coordinates and the determined vehicle position utilizing the coordinates of the sensed roadside objects.

DETAILED DESCRIPTION

Figure 1:
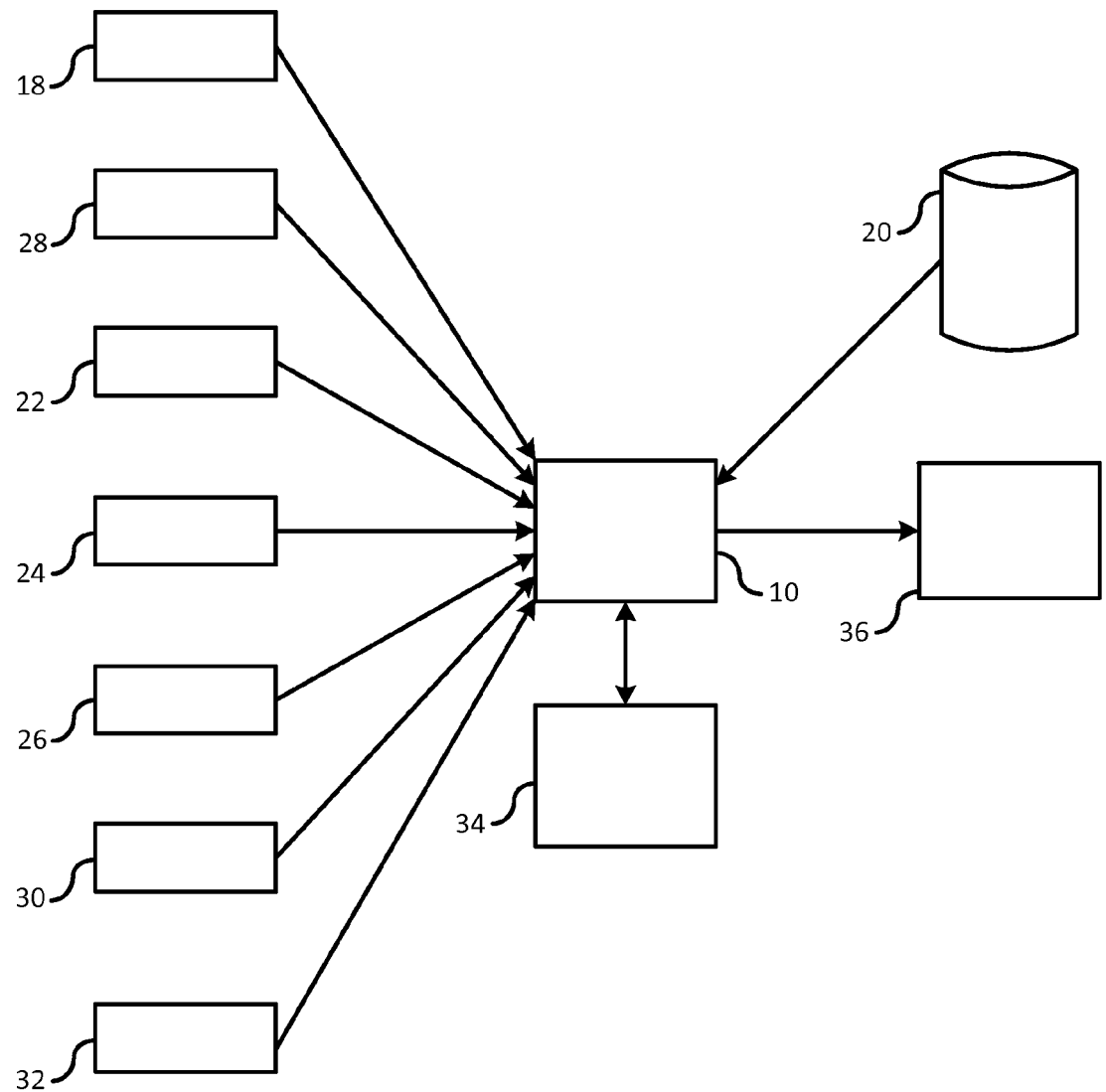
FIG. 1 is a sensor-aided vehicle positioning system.

There is shown in FIG. 1 a sensor-aided vehicle positioning system. The system includes a processing unit 10 for determining a vehicle position on a traveled road. The processing unit 10, may be a standalone processing unit or may be integrated as part of existing system such as a navigation display system. The processing unit 10 obtains input data from various sources for localizing a position of the vehicle on a digital map.

The vehicle obtains a global position utilizing a vehicle positioning system. The vehicle positioning system includes an onboard Global Navigation Satellite System (GNSS) receiver or other Global Positioning System (GPS) receiver 18. It should be understood that the term GNSS and GPS are used herein are interchangeable. A GNSS system includes a global positioning satellite constellation that includes at least 24 or more satellites orbiting the earth in a predetermined path of travel continuously transmitting time marked data signals. A GNSS receiver operates by tracking line of sight signals. These receivers typically require at least four or more satellites to be continuously available in an unobstructed line of sight of a satellite receiver on a vehicle. The GNSS receiver receives the transmitted data and uses this information to determine its absolute position. In viewing the earth in a two dimensional plane, each point on the earth is identified by two coordinates. The first coordinate represents latitude and the second coordinate represents a longitsition in the two dimensional plane, at least three satellites are required as there are three unknowns, two position unknowns and the receiver clock timing error which also treated as an unknown. Some receivers may assume that the altitude stays the same for short duration such that position can be determined with only three satellites; however, if altitude is taken into consideration which is the case for most applications, then at least a minimum of four satellites are required to estimate an absolute position with a certain amount of error.

Satellite receivers operate by tracking line of sight signals which requires that each of the satellites be in view of the receiver. By design, GNSS or other GPS systems ensure that on average, four or more satellites are continuously in the line of sight of a respective receiver on the earth; however, due to urban canyons (i.e., obstructions such as buildings), or driving next to a truck, a lower number of satellites may be in the line of sight, and even more so, obstructions may result in a lower number of satellites than that which is required to accurately determine the position of the satellite receiver.

Global positioning systems made available to the public for public use can have a GPS resolution/accuracy of 30 m in an urban environment. Therefore, the vehicle location in the navigation map may have a 30 m error. While the vehicle positioning error may not have that great of an affect if the vehicle is traveling in a straight line, such positioning errors will be more prevalent if the vehicle is traveling along a curved road. Such positioning errors while traveling along a curved road will cause errors with curvature speed control as well as lane centering control.

Figure 2:
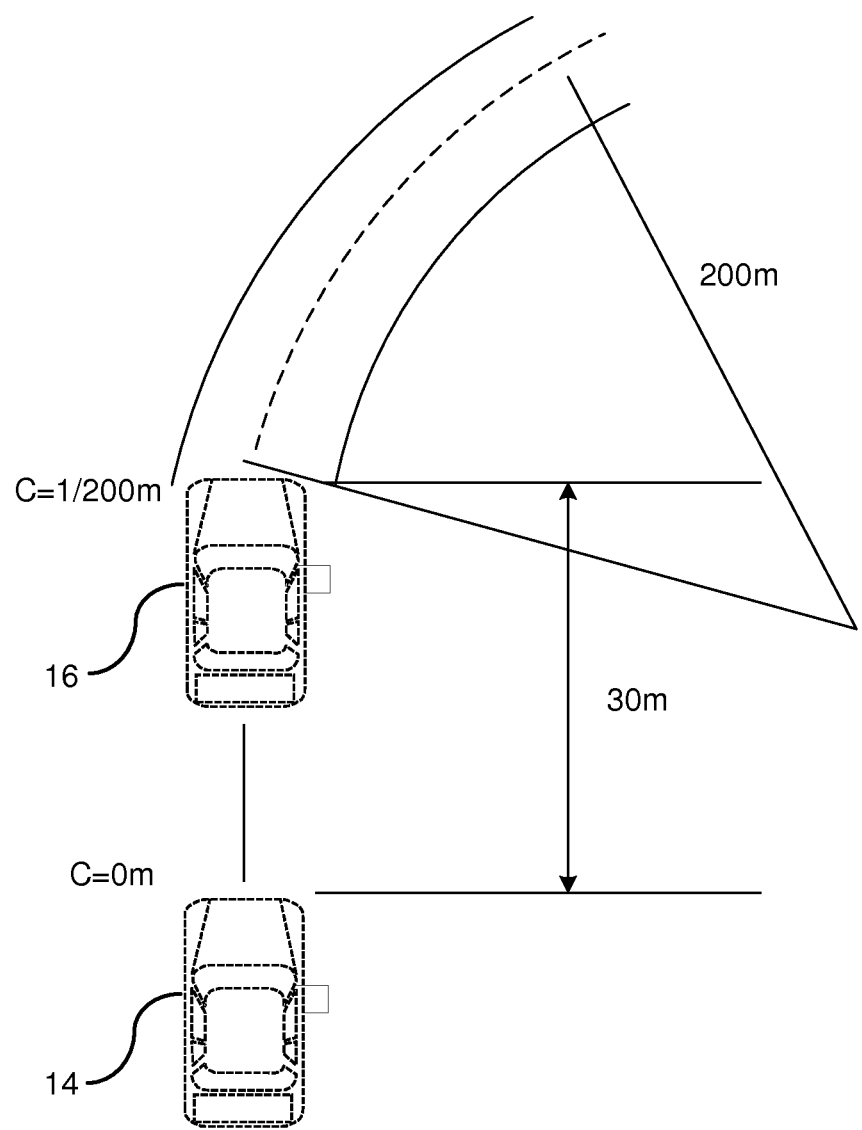
FIG. 2 is a pictorial illustration of a positioning error occurring with GPS position.

FIG. 2 illustrates an error in the GPS positioning of the vehicle. An estimated position of the vehicle is shown generally at 14. An actual position of the vehicle is shown generally at 16. A longitudinal error between the estimated vehicle position 14 and the actual vehicle position 16 is approximately 30 meters. If the curvature length is 200 meters, then it is determined that the curvature error is approximately 1/200 meters. The curvature estimate error is one of the major reasons for an unwanted lateral maneuver. That is, as shown in FIG. 2, a determination is made based on the estimated position as a result of GPS resolution/latency that the vehicle is not traveling in the curved portion of the road; however, as shown, the actual position of the vehicle is in the curved portion of the road. As a result, lane centering as well as speed control within the curved portion of the road is inaccurate.

Referring again to FIG. 1, the sensor-aided vehicle positioning system includes additional sensing devices used to assist in removing error from the GPS-based position. The system includes object detection devices for identifying roadside objects in the region of the road traveled by the vehicle. The objects once detected can be matched to a digital map that includes the various objects so that a more accurate position can be determined from the sensor-aided vehicle positioning system. A database 20 stores digital maps of the area traveled by the vehicle and includes various objects in the vicinity of the traveled road. Therefore, by knowing where a vehicle is in relation to a roadside object, the positioning errors may be corrected for the vehicle GPS position. The object detection devices include, but are not limited to, radar devices 22, lidar devices 24, and imaging capture devices 26. Each of the devices is capable of being detected by the object detection devices. Once detected by the object detection devices, bearing and distance measurements may be obtained. For example, trees trunks, light poles, traffic signs, guard rails, lane markers are only a few of the detected objects that may be sensed by the object detection devices. It should be understood that other objects may be detected as well. The detected objects are then compared with registered objects within the digital map data. Based on the measurement and bearing data measured by the object detection devices, a determination can be made that the objects are the registered objects in the digital map data and an actual position of the vehicle may be identified based on the positional relationship of the vehicle relative to the detected objects. Adjustments can then be made to the GPS position data to compensate for the GPS error.

Other types of signals that may be used include pseudolite signals 28. Pseudolite signals 28 refer to signals that are not from a satellite, but perform a function in the domain of satellites. Pseudolites are typically small transceivers used to create a ground-based GPS alternative for GPS positioning. The range of each transceiver's signal is dependent on the available power. Therefore, if satellite signals are blocked, then pseudolite signals can be used as an alternative to determining the vehicle position and reducing the GPS position error.

Similarly, vehicle positioning may be determined with the aid of WiFi routers 30 or RFID tags 32. The WiFi routers 30 and RFID tags 32 have a fixed position. Therefore measured bearing and distance data from the vehicle to the Wi-Fi router 30 or RFID tags 32 may be used to determine the vehicle position for reducing the GPS position error.

The system further includes a curvature estimator 34 for determining a curvature of the road based on the input data provided to the processor 10. The quality of the curvature of the road as determined by the curvature estimator 34 directly affects the performance of output devices such as curvature speed control systems and lane centering control systems. Therefore, the curvature can be computed by matching the road profile in the digital map with the vehicle GPS location along with any signal input data from the object detection devices or other devices that assist in determining the vehicle position.

Output devices 36 such as lane center control device for centering the vehicle within a lane of road or curvature speed control devices for controlling the speed of a vehicle into a curve, through a curve, and out of a curve utilize the adjusted position data determined from the processor 10. The output devices 36 as described herein are only examples of the various devices that may utilize the corrected GPS position data as output from the processor.

Figure 3:
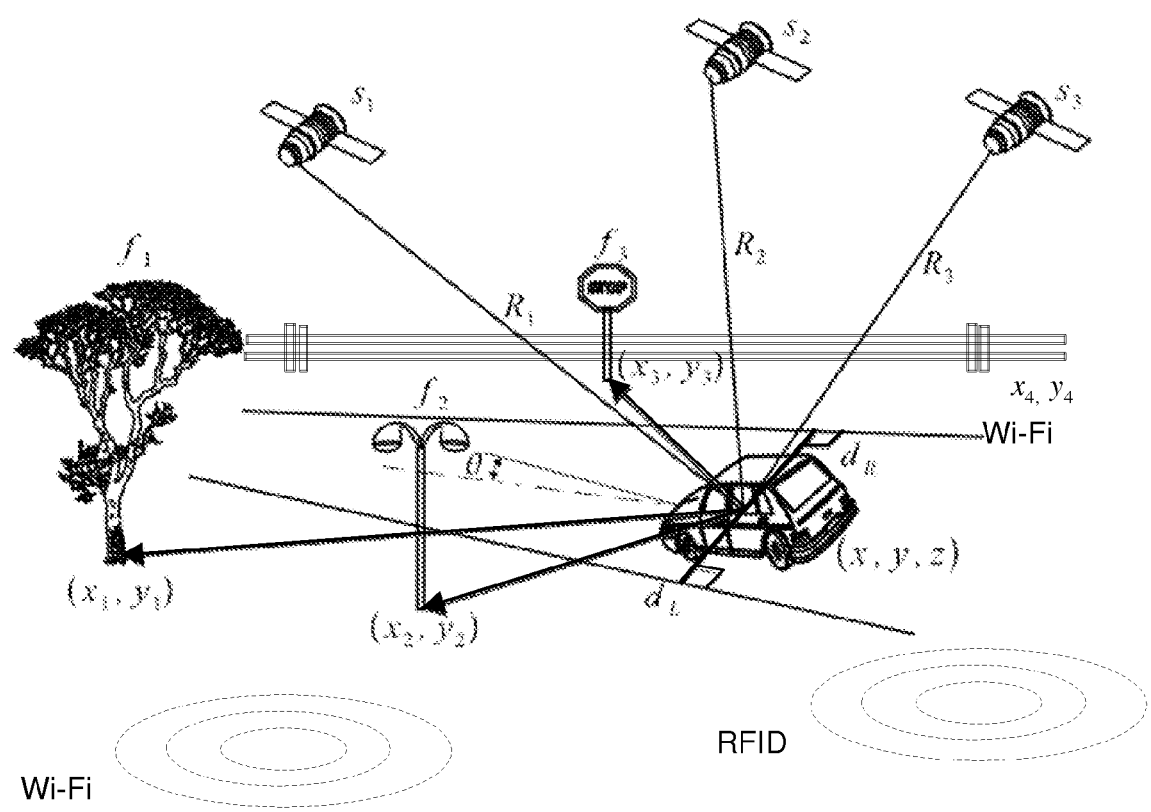
FIG. 3 is a pictorial illustration external of objects sensed by the vehicle for vehicle positioning.

FIG. 3 shows a pictorial illustration of the vehicle and the various signals obtained from peripheral devices that can be used to correct the positioning errors of the GPS system. As illustrated in FIG. 3, GPS signals are transmitted by at least three satellites $s_1$, $s_2$, $s_3$ for obtaining GPS data that is utilized for determining a global position. Various objects are sensed by vehicle-based object detection devices and coordinates are determined for each object. For examples, object detection devices may detect a tree trunk $(x_1, y_1)$, a light pole $(x_2, y_2)$, a street sign $(x_3, y_3)$ and a guard rail $(x_4, y_4)$. Distances to the each side of the road $(d_L, d_R)$ may be determined if lane markers or other markings identifying the edges of the road (e.g., road edge detection devices) are utilized. Each of the objects once identified may be compared to registered digital map data for determining the position of those objects and the position of the vehicle $(x, y, z)$. In addition, the curvature of the road may also be computed, and the bearing of the vehicle relative to the curvature may be determined as well. In addition, fixed devices such as Wi-Fi routers and RFID tags in which the vehicle receives signals may be used in cooperation with other input signals for determining a position of the vehicle within the digital map.

For those objects that are stationary objects, assume these point stationary objects (e.g., tree trunk, light poles, traffic signs, WI-FI access points, active tags such as RFIDs, and overhead GNSS satellites) and line stationary objects (e.g., lane markers and guard rails) are represented in a fixed known local coordinate system (O-xyz). One of the examples for the local coordinate system is an east-north-up system with the origin being expressed as a known coordinate in the world geodetic system (WGS84). To simplify the formulation, an assumption is made that the vehicle is driven on ground plane which is expressed as $(z=0)$. The objective is to find the vehicle position (x,y), orientation ($\phi$), and longitudinal velocity ($v_h$) on the ground plane. The steps are as follows:

First, let the position of the satellites $s_1$, $s_2$, and $s_3$ be expressed as $P_1$, $P_2$, and $P_3$, respectively, and the velocity of the satellites be expressed as $V_1$, $V_2$, and $V_3$, respectively. Let $P_H=(x,y,0)^T$ be the host vehicle position, and $V_H=(v_h \cos \phi, v_h \sin \phi, 0)$ where x, y, and $\phi$ are the vehicle's position and heading, respectively, and $v_h$ denotes the vehicle's longitudinal speed.

The range measurements from the satellites $s_1$, $s_2$, and $s_3$ are as follows:

$$\|P_1-P_H\|=R_1$$

$$\|P_2-P_H\|=R_2$$

$$\|P_3-P_H\|=R_3.$$

The Doppler measurements from the satellites $s_1$, $s_2$, and $s_3$ are as follows:

$$(V_1-V_H)\cdot \frac{P_1-P_H}{\|P_1-P_H\|}=D_1$$

$$(V_2-V_H)\cdot \frac{P_2-P_H}{\|P_2-P_H\|}=D_2$$

$$(V_3-V_H)\cdot \frac{P_3-P_H}{\|P_3-P_H\|}=D_3$$

where $R_1$, $R_2$, and $R_3$ are the range measurement to the satellites $s_1$, $s_2$, and $s_3$, respectively, and $D_1$, $D_2$, and $D_3$ are the Doppler measurement to the satellites $s_1$, $s_2$, and $s_3$, respectively. By linearizing the abovementioned measurement equations, the positioning problem is transformed to the following minimizing representation:

$$\min_x \|H_{GSNN} x - o_{GSNN}\|^2$$

where $x=(x,y,v_h,\phi)^T$, $H_{GSNN}$ is the derived Jacobian matrix, and $o_{GNSS}$ is the normalized measurement derived from the satellite measurements.

Next, assume that the position of WI-FI access point (AP) is known as $P_{WIFI}$, and the position of radio frequency identification tag (RFID) as $P_{RFID}$. The distance between the vehicle and WI-FI AP can be inferred from the received signal strength, denoted by $R_{WIFI}$. Similarly, the distance between the vehicle and the RFID is measured as $R_{RFID}$. The result is two additional measurement equations:

$$\|P_{WIFI}-P_H\|=R_{WIFI}$$

$$\|P_{RFID}-P_H\|=R_{RFID}$$

Linearizing the two additional measurement equations, the minimization representation is as follows:

$$\min_x \|H_{WR} x - o_{WR}\|^2$$

where $H_{WR}$ is the derived Jacobian matrix, and $o_{WR}$ is the normalized measurement derived from $R_{WIFI}$ and $R_{RFID}$.

Next, let the position of tree trunk, light pole, and traffic sign be denoted by $P_T=(x_1,y_1)$, $P_L=(x_2,y_2)$, and $P_S=(x_3,y_3)$. The sensor (radar or lidar) measurement can be expressed as follows:

$$P_T-P_H=p_T$$

$$P_L-P_H=p_L$$

$$P_S-P_H=p_S$$

where $p_T$, $p_L$, and $p_S$ are the position measurements of these point stationary objects (tree trunk, light pole, and traffic sign). The Doppler (radian velocity) measurement of these objects can be represented as follows:

$$-V_H \cdot \frac{P_T-P_H}{\|P_T-P_H\|}=V_T$$

$$-V_H \cdot \frac{P_L-P_H}{\|P_L-P_H\|}=V_L$$

$$-V_H \cdot \frac{P_S-P_H}{\|P_S-P_H\|}=V_S$$

where $V_T$, $V_L$, and $V_S$ are direct velocity measurements for the tree trunk, light pole, and traffic sign, respectively. By linearizing the sensor-based measurement equations, the minimization is represented as follows:

$$\min_x \|H_{SEN} x - o_{SEN}\|^2$$

where $H_{SEN}$ is the derived Jacobian matrix, and $o_{SEN}$ is the normalized measurement derived from the sensor measurements.

Lastly, an assumption is made that lane marker is expressed in line with the orientation angle $\eta$ and distance d. The result is $(\eta_L, D_L)$ for the left lane marker, $(\eta_R, D_R)$ for the right lane marker, and $(\eta_G, D_G)$ for the guard rail. Therefore, the angle measurement equations are as follows:

$$\eta_L - \phi = \theta_L$$

$$\eta_R - \phi = \theta_R$$

$$\eta_G - \phi = \theta_G$$

and the lateral offset measurement equations are as follows:

$$x \cos \eta_L - y \sin \eta_L + D_L = d_L$$

$$x \cos \eta_R - y \sin \eta_R + D_R = d_R$$

$$x \cos \eta_G - y \sin \eta_G + D_G = d_G$$

where $\theta_L$, $\theta_R$, and $\theta_G$ are the measured relative orientation of the left lane marker, right lane marker, and guard rail, respectively, and $d_L$, $d_R$, and $d_G$ are the lateral offset to the left lane marker, right lane marker, and guard rails, respectively.

Therefore the minimization formula is represented as follows:

$$\min_x \|H_{LIN} x - o_{LIN}\|^2$$

where $H_{LIN}$ is the derived Jacobian matrix, and $o_{LIN}$ is the normalized measurement derived from the line measurements.

In summary, the vehicle position and orientation can be solved by minimizing the following equation:

$$\min_x \|H_{GSNN} x - o_{GSNN}\|^2 + \|H_{WR} x - o_{WR}\|^2 + \|H_{SEN} x - o_{SEN}\|^2 + \|H_{LIN} x - o_{LIN}\|^2$$

which can be rewritten as the following equation:

$$\min_x \left\| \begin{pmatrix} H_{GSNN} \\ H_{WR} \\ H_{SEN} \\ H_{LIN} \end{pmatrix} x - \begin{pmatrix} o_{GSNN} \\ o_{WR} \\ o_{SEN} \\ o_{LIN} \end{pmatrix} \right\|^2$$

or $$\min_x \|Ax - o\|^2.$$

The above least-squares problem can be solved by QR decomposition using the following steps:
1) Compute the QR decomposition of the augmented matrix [A o]=QR
2) Find the submatrices of $$\text{Find the submatrices of} = \begin{pmatrix} r_{11} & r_{12} & r_{13} & r_{14} & z_1 \\ r_{21} & r_{22} & r_{23} & r_{24} & z_2 \\ r_{31} & r_{32} & r_{33} & r_{34} & z_3 \\ r_{41} & r_{42} & r_{43} & r_{44} & z_4 \\ \vdots & \vdots & \vdots & \vdots & \vdots \end{pmatrix}.$$

We define $$R_4 = \begin{pmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{pmatrix} \text{ and } z = \begin{pmatrix} z_1 \\ z_2 \\ z_3 \\ z_4 \end{pmatrix}.$$

The vehicle position $x=R_4^{-1}z$, and corresponding covariance matrix $\Sigma=R_4^{-1}R_4^{-T}$.

Figure 4A:
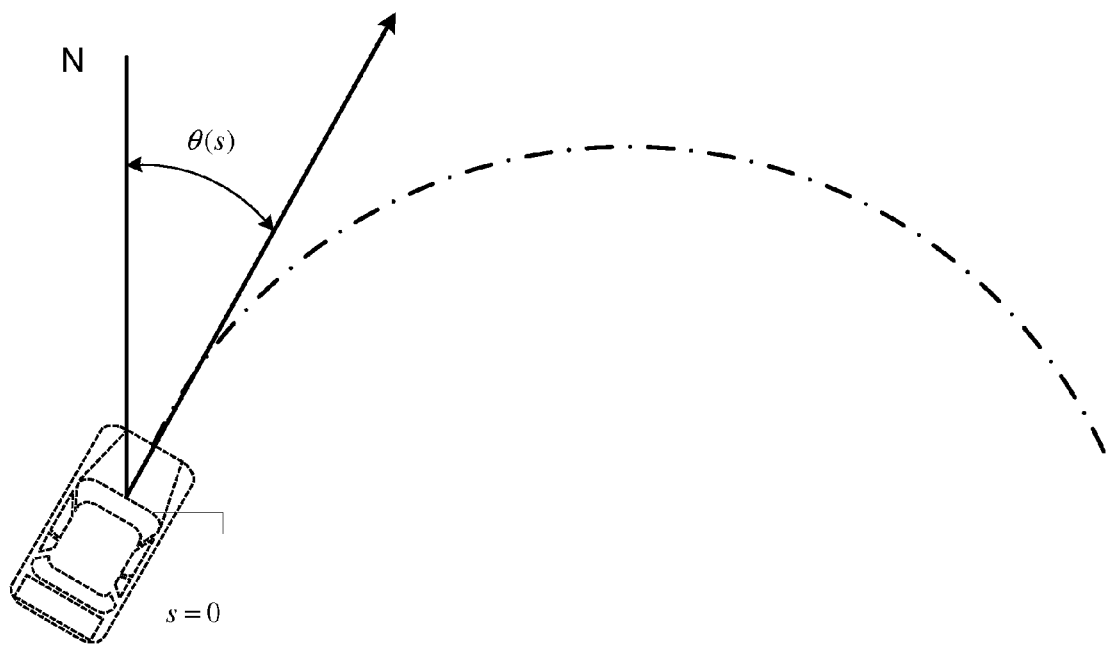
FIG. 4*a* illustrates road curve represented by an arc.
Figure 4B:
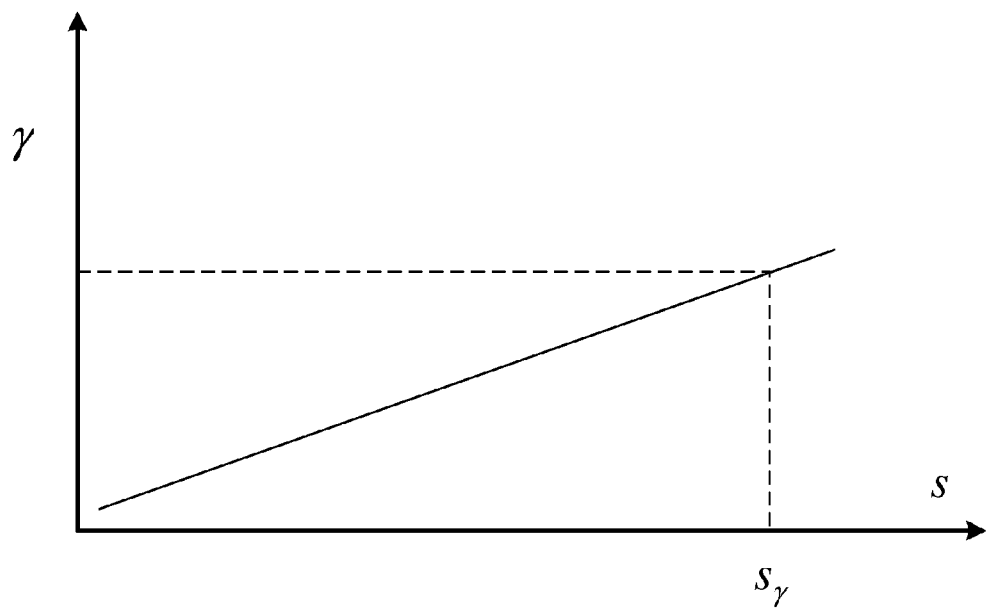
FIG. 4*b* illustrates a graph for identifying a position based on as a function of heading measurement.

FIGS. 4a and 4b illustrate a technique for determining a vehicle position in the curved road using GPS heading data and map curvature data. FIG. 4a illustrates a road curve and is represented by the heading as a function of an arc length $\theta=\theta(s)$. As shown in FIG. 4a, the direction of curve $\theta(s)$ at any point along the curve can be determined based on the bearing of the vehicle relative to a fixed direction (e.g., due north). Therefore, given the GPS measurement and heading γ, a vehicle location(s) is derived by applying an inverse function as shown in the graph in FIG. 4b and is represented by the formula $s_\gamma=\theta^{-1}(\gamma)$.

Figure 5A:
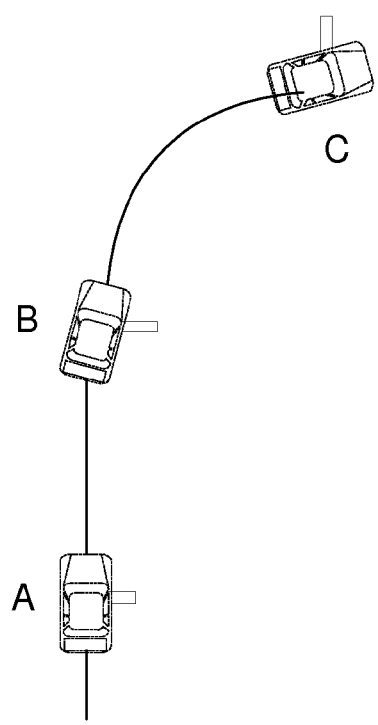
FIG. 5*a* illustrates a vehicle transitioning through a curved portion of a road.
Figure 5B:
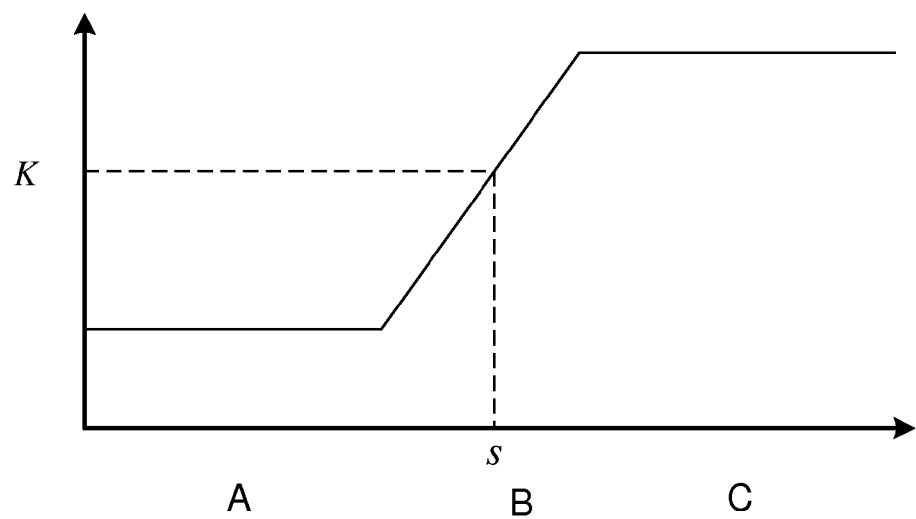
FIG. 5*b* illustrates a graph for determining a vehicle position based on a known curvature of a road.

Another technique for determining the vehicle's position utilizing the GPS heading and the map curvature is shown in FIGS. 5a and 5b. An assumption is made that the lane curvature is known and is a function of the vehicle position from the digital map. FIG. 5a illustrates a vehicle transitioning through a curve at different points. Region A represents the vehicle traveling along a linear portion of the road. Region B represents the position as it transitions from the linear portion of the road to the curved portion of the road. Region C represents the position of the vehicle when the vehicle is fully engaged in the curved portion of the road. FIG. 5b is a graph of road curvature (K) vs a position of the vehicle (s). By knowing where the vehicle is on the curvature of the road when it transitions from a linear road to a curved portion, a position of the vehicle can be determined. The curvature of the road is represented by the following formula:

$$K=f(s)$$

where K is the curvature and s is a position of the vehicle. An assumption is also made that the lane curvature is measured by the imaging device, such as a camera, or other lane mark sensing device. A vehicle position can be determined from the inverse function of the curvature formula:

$$s=f^{-1}(K)$$

where s is the position of the vehicle and K is the curvature. Utilizing the graph in FIG. 5b, the position of the vehicle can be determined particular in and out of the curvature transition regions (e.g., Region B).

Figure 6:
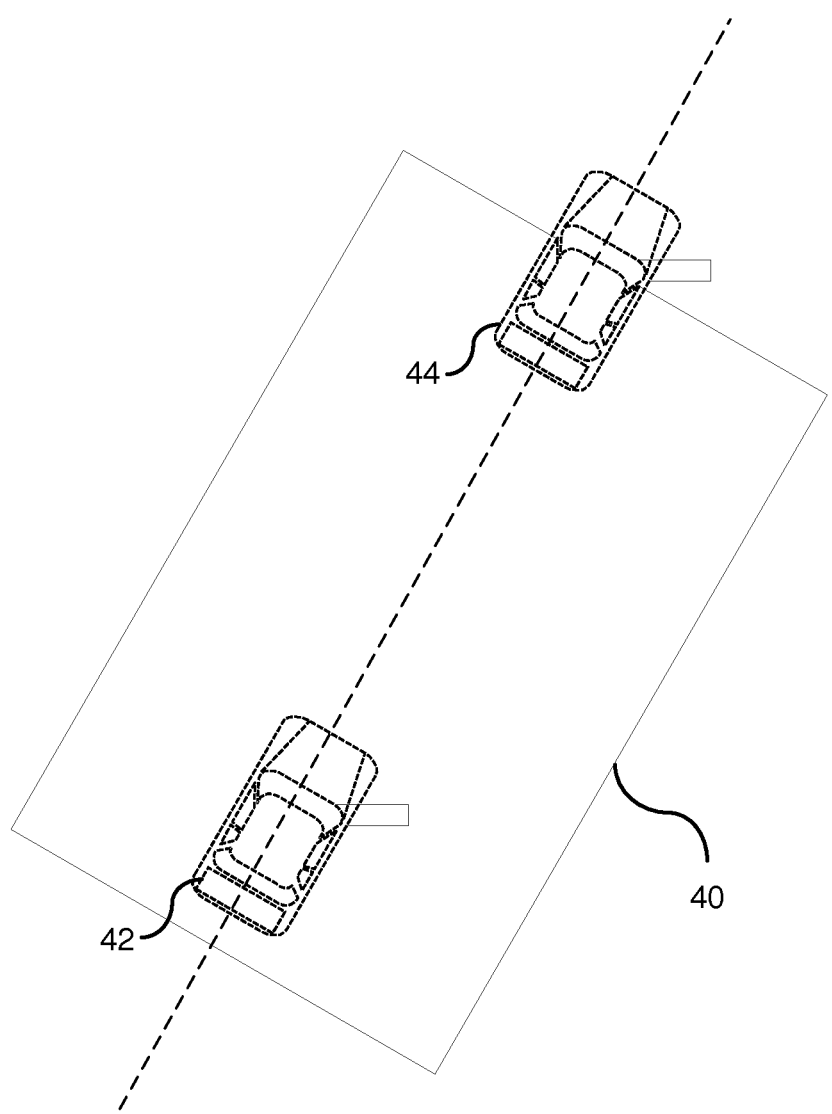
FIG. 6 is a pictorial illustration of a vehicle having GPS signal blockage.

FIG. 6 represents an illustration where the GPS signals from the satellites are blocked due to an obstruction. In the event of GPS blockage by obstructions such as bridges, assumptions can be made without being able to monitor the vehicle while the obstruction is occurring. In FIG. 6, a vehicle is shown traveling under a bridge 40. Position 42 represent a point where all satellite signals are lost. The vehicle is assumed to be at position 42 when the signal from all satellites is lost. Position 44 is the point where the vehicle is visible by at least one satellite. Typically, there must be three visible satellites in which a vehicle must see in order to determine an accurate GPS position; however, when only one satellite signal is received, then the assumption is made that the vehicle is at point 44. This represents the position that a first satellite signal may be received from the vehicle as it exits the obstruction. Therefore, the system does not require that it wait until three or more satellite signals are received at the vehicle. Rather, the coordinates of point 44 may be assumed as soon as one satellite signal is visible.

Figure 7:
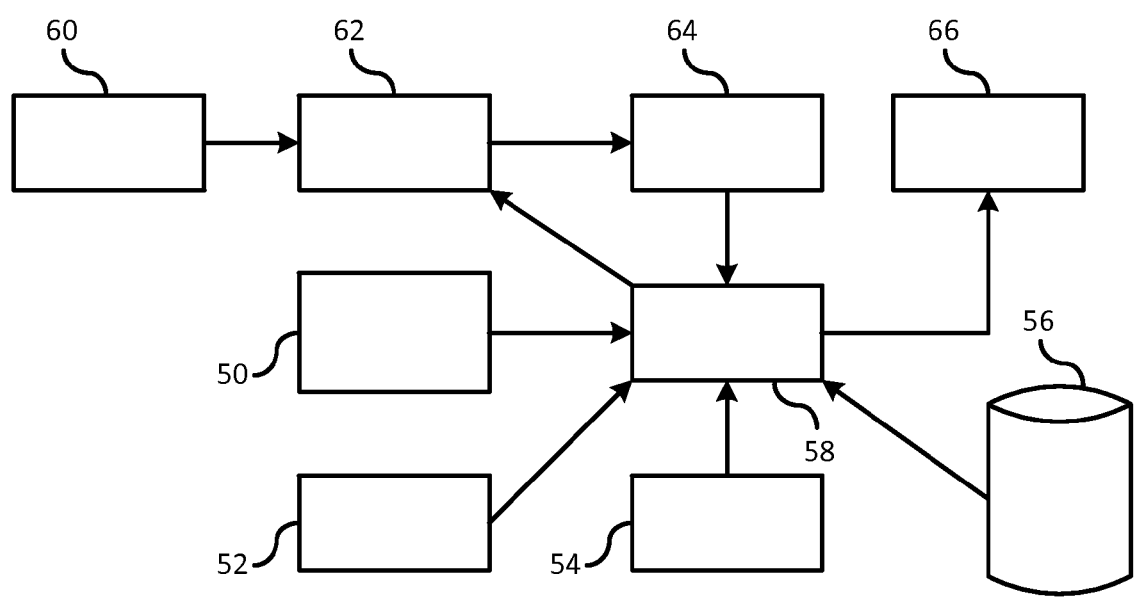
FIG. 7 illustrates a flow diagram for correcting GPS errors using sensed roadside objects.

FIG. 7 illustrates a flow diagram for correcting GPS errors using sensed roadside objects. In step 50, GPS coordinates are obtained utilizing the constellation of satellite signals. Pseudo-range signal-noise-ratio may also be used as a factor for determining position of the vehicle. The GPS related data is used as inputs to the processing unit for removing error from the identified GPS position using other sensor aided data.

In step 52, a relative position of roadside objects are obtained (e.g., from light poles, bridges, guard rails) using object detection devices.

In step 54, road curvature information relative to a position of road side objects (e.g., traffic sign) is obtained from object detection devices such as a forward view vehicle imaging device.

In step 56, registered object data in digital maps is obtained from a database. This includes information, including coordinates for each of the registered objects within the digital map of the vicinity of the traveled road.

In step 58, a processing module is provided for receiving input data from each of the devices described in blocks 50-56. The processing unit utilizes the various data to determine positioning errors in the GPS data.

In step 60 GPS/inertia/speedometer positioning information is input to a GPS-based map matching module in step 62. In addition, the data gathered by the processing module in step 56 is provided to the GPS-based map matching module. The data from steps 60 and 62 are matched to determine whether the input data matches.

In step 64, the results from the GPS-based map matching module is applied to the ADASIS horizon protocol. ADASIS is a protocol that defines a standardized data model and structure to represent map data in the vicinity of the vehicle position. The ADASIS horizon data is then input back into the processing module in step 58 where the positioning techniques as described herein are applied to the map data for removing errors from the data.

In step 66, heading, curvature, and position information is output to at least one output device. The output device may include curvature speed control for controlling speed through curved portion of the road, or a lane centering control to maintain the position of the vehicle with the center of the lane, particularly, when traveling in the curved portion of the road.

While certain embodiments of the present invention have been described in detail, those familiar with the art to which this invention relates will recognize various alternative designs and embodiments for practicing the invention as defined by the following claims.

What is claimed is:

1. A method for localizing a vehicle in a digital map comprising:
   generating GPS coordinates of the vehicle on the traveled road;
   retrieving from a database a digital map of a region traveled by the vehicle based on the location of the GPS coordinates, the digital map including a geographic mapping of a traveled road and registered roadside objects, the registered roadside objects being positionally identified in the digital map by longitudinal and lateral coordinates;
   sensing roadside objects in the region traveled by the vehicle;
   identifying the sensed roadside objects on the digital map;
   determining a vehicle position on the traveled road utilizing coordinates of the sensed roadside objects identified in the digital map; and
   localizing the position of the vehicle in the road of travel as a function of the GPS coordinates and the determined vehicle position utilizing the coordinates of the sensed roadside objects, wherein localizing the position of the vehicle in the road of travel is further a function of identifying a curvature of the road and determining a vehicle position based on a location of the vehicle within the curvature, wherein the curvature formula is represented as:

$$K=f(s)$$

where s is the position of the vehicle and K is the curvature of the road.

2. The method of claim 1 further comprising the step of determining a heading of the vehicle and a curvature of the traveled road as a function of the GPS coordinates and the determined vehicle position utilizing the coordinates of the sensed roadside objects.

3. The method of claim 2 wherein the heading of the vehicle and the curvature of the traveled road is provided to a curvature estimator, wherein the curvature estimator enables curvature speed control of the vehicle.

4. The method of claim 2 wherein the heading of the vehicle and the curvature of the traveled road is provided to a curvature estimator for enabling lane centering control of the vehicle.

5. The method of claim 2 further comprising the steps of localizing a position of the vehicle in a curved road as a function of the heading of the vehicle and the curvature of the traveled road.

6. The method of claim 1 wherein the sensed roadside objects are detected using a forward imaging system.

7. The method of claim 1 wherein the sensed roadside objects are detected using a radar-based system.

8. The method of claim 1 wherein localizing the position of the vehicle in the road of travel as a function of the GPS coordinates and the determined vehicle position utilizing the coordinates of the sensed roadside objects further includes determining a relative position of the vehicle utilizing Wi-Fi routers.

9. The method of claim 1 wherein localizing the position of the vehicle in the road of travel as a function of the GPS coordinates and the determined vehicle position utilizing the coordinates of the sensed roadside objects further includes determining a relative position of the vehicle utilizing RFID tags.

10. The method of claim 1 wherein localizing the position of the vehicle in the road of travel as a function of the GPS coordinates and the determined vehicle position utilizing the coordinates of the sensed roadside objects further includes determining a relative position of the vehicle utilizing pseudolite signals.

11. A method for localizing a vehicle in a digital map comprising:
    generating GPS coordinates of the vehicle on the traveled road;
    retrieving from a database a digital map of a region traveled by the vehicle based on the location of the GPS coordinates, the digital map including a geographic mapping of a traveled road and registered roadside objects, the registered roadside objects being positionally identified in the digital map by longitudinal and lateral coordinates;
    sensing roadside objects in the region traveled by the vehicle;
    identifying the sensed roadside objects on the digital map;
    determining a vehicle position on the traveled road utilizing coordinates of the sensed roadside objects identified in the digital map; and
    localizing the position of the vehicle in the road of travel as a function of the GPS coordinates and the determined vehicle position utilizing the coordinates of the sensed roadside objects, wherein localizing the position of the vehicle is further a function of identifying a heading of the vehicle and an arc length of a curvature of the road, wherein the vehicle location based on the arc length is represented as:

$$s_y=\theta^{-1}(y)$$

where $s_y$ is the position of the vehicle, $\theta$ is a road curve, and y is the heading of the road.

12. A method for localizing a vehicle in a digital map comprising:
    generating GPS coordinates of the vehicle on the traveled road;
    retrieving from a database a digital map of a region traveled by the vehicle based on the location of the GPS coordinates, the digital map including a geographic mapping of a traveled road and registered roadside objects, the registered roadside objects being positionally identified in the digital map by longitudinal and lateral coordinates;
    sensing roadside objects in the region traveled by the vehicle;
    identifying the sensed roadside objects on the digital map;
    determining a vehicle position on the traveled road utilizing coordinates of the sensed roadside objects identified in the digital map; and
    localizing the position of the vehicle in the road of travel as a function of the GPS coordinates and the determined vehicle position utilizing the coordinates of the sensed roadside objects, wherein localizing the position of the vehicle further comprises the steps of:
    identifying a position of the vehicle when a GPS signal is lost due to an obstruction;
    determining when a first satellite signal is received after the GPS signal is lost;
    localizing the vehicle at a predetermined position in response to the determination that the first satellite signal is received.

* * * * *